US010467130B2

(12) United States Patent
Raghavan et al.

(10) Patent No.: US 10,467,130 B2
(45) Date of Patent: Nov. 5, 2019

(54) METHOD OF GENERATING AND TRANSFORMING TEST DATA AND A SYSTEM THEREFOR

(71) Applicant: Wipro Limited, Bangalore (IN)

(72) Inventors: Girish Raghavan, Chennai (IN); Venkatesan Marimuthu, Chennai (IN); Saravanan Kalimuthu, Chennai (IN); Prashanth A Davey, Chennai (IN); Thamilchelvi Peterbarnabas, Chennai (IN); Selvan Nagaraja, Bangalore (IN)

(73) Assignee: Wipro Limited, Bangalore (IN)

( * ) Notice: Subject to any disclaimer, the term of this patent is extended or adjusted under 35 U.S.C. 154(b) by 240 days.

(21) Appl. No.: 15/463,664

(22) Filed: Mar. 20, 2017

(65) Prior Publication Data

US 2018/0210821 A1 Jul. 26, 2018

(30) Foreign Application Priority Data

Jan. 20, 2017 (IN) .............................. 201741002359

(51) Int. Cl.
*G06F 11/36* (2006.01)
*G06F 16/21* (2019.01)
*G06F 16/903* (2019.01)
*G06F 16/2452* (2019.01)
(Continued)

(52) U.S. Cl.
CPC ...... *G06F 11/3684* (2013.01); *G06F 11/3668* (2013.01); *G06F 16/21* (2019.01);
(Continued)

(58) Field of Classification Search
CPC .............. G06F 11/263; G06F 11/3672; G06F 11/3684; G06F 11/3688; G06F 16/242;
(Continued)

(56) References Cited

U.S. PATENT DOCUMENTS 8,473,279 B2 6/2013 Al-Shammari
2003/0191774 A1* 10/2003 Slutz .................. G06F 11/3672
(Continued)

FOREIGN PATENT DOCUMENTS

JP 2001256076 A * 9/2001 .............. G06F 11/28

OTHER PUBLICATIONS

Extended European Search Report issued in the European Patent Office in counterpart European Application No. 17163922.2, dated Oct. 16, 2017, 8 pages.

*Primary Examiner* — Gabriel Chu
(74) *Attorney, Agent, or Firm* — Finnegan, Henderson, Farabow, Garrett & Dunner, LLP (57) ABSTRACT

The present disclosure relates to a method and system for generating and transforming test data. The one embodiment, a user query is received in natural language and parsed to generate keywords using lemmatization. Based on the generated keywords and filter conditions in the user query, a data source specific executable query suitable for data sources is generated and executed against each data source to generate test data. The method determines if there are any missing test data in the generated test data and creates missing test data based on the data type, number of records required. The method also automatically transforms the generated test data into corresponding test data suitable to the requirements of a target system. Thus, the system generates test data specific to different data sources based on query provided in natural language and transforms the generated test data to comply with the requirements of the target system.

18 Claims, 4 Drawing Sheets

(51) Int. Cl.
*G06F 16/9032* (2019.01)
*G06F 16/25* (2019.01)

(52) U.S. Cl.
CPC ........ *G06F 16/24522* (2019.01); *G06F 16/25* (2019.01); *G06F 16/90332* (2019.01); *G06F 16/90335* (2019.01)

(58) Field of Classification Search
CPC ............... G06F 16/243; G06F 16/2452; G06F 16/24534; G06F 16/24547; G06F 16/2457; G06F 16/24573; G06F 16/258; G06F 16/332; G06F 16/3322; G06F 16/3329; G06F 16/3331; G06F 16/3332; G06F 16/3334; G06F 16/3344; G06F 16/832; G06F 16/8358; G06F 16/8365; G06F 16/8373; G06F 16/84; G06F 16/86; G06F 16/9032; G06F 16/90324; G06F 16/90332; G06F 16/90335; G06F 16/9035
See application file for complete search history.

(56) References Cited

U.S. PATENT DOCUMENTS

| | | | |
|---|---|---|---|
| 2008/0097974 A1* | 4/2008 | Chen | G06F 11/3684 |
| 2008/0319969 A1 | 12/2008 | Dettinger et al. | |
| 2010/0251032 A1 | 9/2010 | Macary et al. | |
| 2010/0306591 A1* | 12/2010 | Krishna | G06F 16/24549 |
| | | | 714/35 |
| 2013/0198217 A1* | 8/2013 | Narula | G06F 16/90335 |
| | | | 707/759 |
| 2015/0039591 A1* | 2/2015 | Ding | G06F 16/90335 |
| | | | 707/722 |
| 2015/0113330 A1 | 4/2015 | Grondin | |
| 2015/0254174 A1* | 9/2015 | Harding | G06F 16/176 |
| | | | 707/718 |
| 2018/0095866 A1* | 4/2018 | Narayanan | G06F 11/3684 |
| 2018/0196738 A1* | 7/2018 | Murata | G06F 11/3684 |

* cited by examiner

METHOD OF GENERATING AND TRANSFORMING TEST DATA AND A SYSTEM THEREFOR

FIELD OF THE DISCLOSURE

The present subject matter is related, in general to testing database applications, and more particularly, but not exclusively to a test data generation and transformation system and method thereof.

BACKGROUND

In an end-end test lifecycle, test data plays an important role for a tester/business user to validate the product or application under test. Timely availability of right test data plays a crucial role in completing the test cases execution. To solve this problem, the tester is required to possess the required technical knowledge to fetch test data from multiple source systems through structured queries. Secondly, the time taken to source the test data by working with different teams responsible for test data management is time consuming thereby having an impact on cost and time to market. Finally, the test data which is fetched need to be conditioned to meet the data definition of target/consuming systems. However, the test data generation process is repetitive and labor intensive. Therefore, there is a need for a method and a system that automatically generates test data and transforms the generated test data to comply with the requirements of the target system.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of generating and transforming test data. The method comprising the step of receiving a test data query, in natural language. The test data query comprising at least a selection parameter for generation of test data from one or more data sources. The method further comprises the step of parsing the received test data query to extract a plurality of domain specific keywords and mapping the plurality of domain specific keywords with predetermined domain specific meta-data to determine one or more columns, tables, and filter conditions associated with the received test data query. The domain specific meta-data data is associated with each column and table of one or more data sources. Based on at least the selection parameter and the mapped plurality of domain specific keywords, a data source specific executable query comprising one or more columns, tables, and filter conditions associated with the received test data query is determined and executed in the one or more data sources to generate the test data.

Further, the present disclosure relates to a test data generation and transformation system. The system comprises at least a processor and a plurality of data sources communicatively coupled to the processor. The system also comprises a memory communicatively coupled with the processor, wherein the memory stores processor-executable instructions, which, on execution, cause the processor to receive a test data query in natural language comprising at least a selection parameter for generation of test data from the one or more data sources. Further, the processor is configured to parse the received test data query to extract a plurality of domain specific keywords and map the plurality of domain specific keywords with predetermined domain specific meta-data to determine one or more columns, tables, and filter conditions associated with the received test data query. The domain specific meta-data data is associated with each column and table of one or more data sources. Based on at least the selection parameter and the mapped plurality of domain specific keywords, the processor is further configured to determine a data source specific executable query comprising one or more columns, tables, and filter conditions associated with the received test data query and execute the data source specific executable query in the one or more data sources to generate the test data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings; which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for generating and transforming test data. In one embodiment, a user query is received in natural language and parsed to generate keywords using lemmatization. Based on the generated keywords, filter conditions in the user query, a generic user query is generated which is further processed into data source specific executable query suitable for each of data sources coupled with the system. The data source specific executable query is executed against each data source to generate test data. The method also determines if there are any missing test data in the generated test data and creates missing test data based on the data type, number of records required. The method also automatically transforms the generated test data into corresponding test data suitable to the requirements of a target system. Thus, the system generates test data specific to different data sources based on query provided in natural language and transforms the generated test data to comply with the requirements of the target system.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
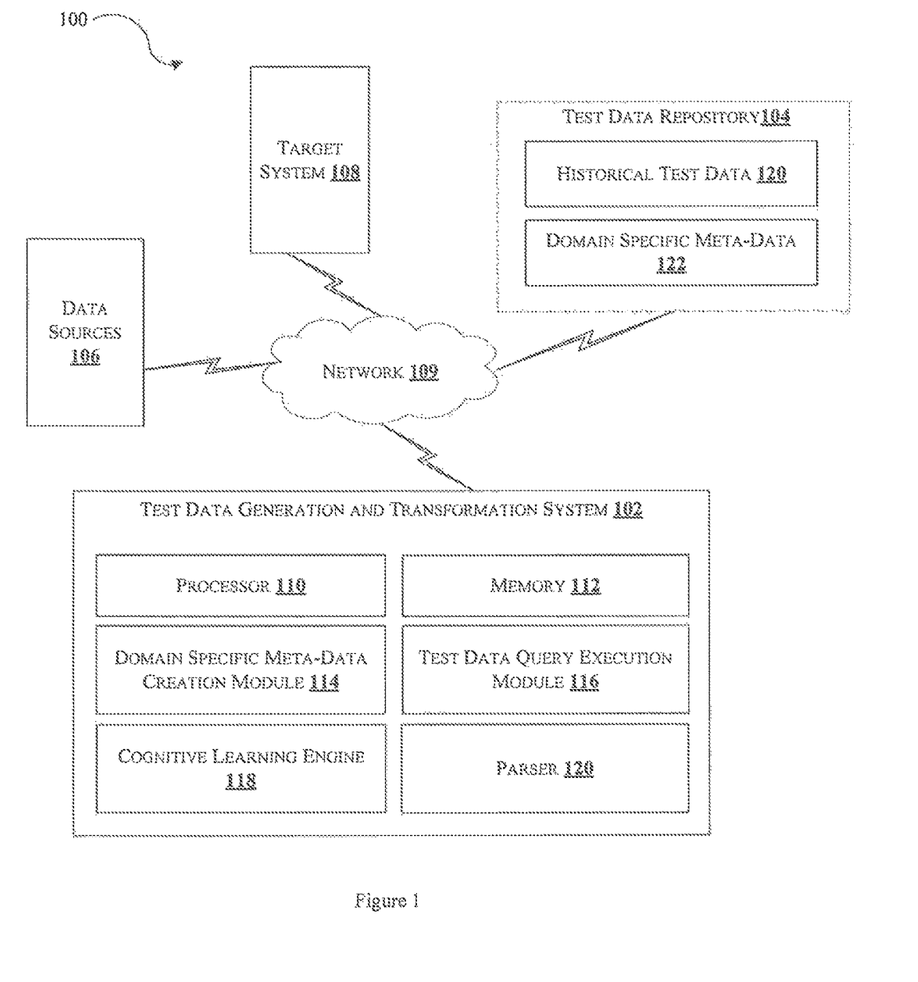
FIG. 1 illustrates an architecture diagram of an exemplary system for generating and transforming test data in accordance with some embodiments of the present disclosure.

FIG. 1 illustrates an architecture diagram of an exemplary system for generating and transforming test data in accordance with some embodiments of the present disclosure.

As shown in FIG. 1, the exemplary system 100 comprises one or more components configured for generating and transforming test data. In one embodiment, the exemplary system 100 comprises a test data generation and transformation system (hereinafter referred to as test data generator) 102, a test data repository 104, a plurality of data sources 106, and a target system 108 connected via a communication network 109.

The system 100 may be implemented using a database management system (DBMS) or file sources for any type of database model, including relational, hierarchical, attribute-value, object, network, and related database models. The system 100 may be implemented using a single computer or a network of computers including cloud-based computer implementations. The plurality of data sources 106 stores data associated with one or more databases, applications that can store, access and operate on the data. In one embodiment, the data source contains databases using a relational database model comprising a series of tables, each table representing a particular entity type or operation type, and having one or more columns defining fields of the data, and one or more rows storing instances of data corresponding to the entity or operation type. Data source specific drivers are used by the test data generator 102 to access data from the plurality of data sources 106 using queries. The plurality of data sources 106 may be for example, Oracle, SQL Server, NoSQL, files or other related databases, can be configured to retrieve the meta data information about the databases and files stored within the plurality of data sources 106.

The test data generator 102 comprises at least a processor 110 and a memory 112 coupled with the processor 110. The test data generator 102 further comprises a domain specific meta-data creation module (hereinafter referred to as meta-data creation module) 114, a test data query execution module (hereinafter referred to as query execution module) 116, and a cognitive learning engine 118.

The data repository 104 stores historical test data 120 comprising a plurality of historical test data queries and a plurality of test data generated in the past based on the plurality of historical test data queries. The data repository 104 also stores a plurality of domain specific meta-data 122 determined in real-time from databases like Oracle, SQL Server, NoSQL, file data sources and domain data. In one embodiment, the data repository 104 may be integrated within the test data generator 102. In another embodiment, the data repository 104 may be implemented as standalone storage system disposed external to the test data generator 102.

Figure 2:
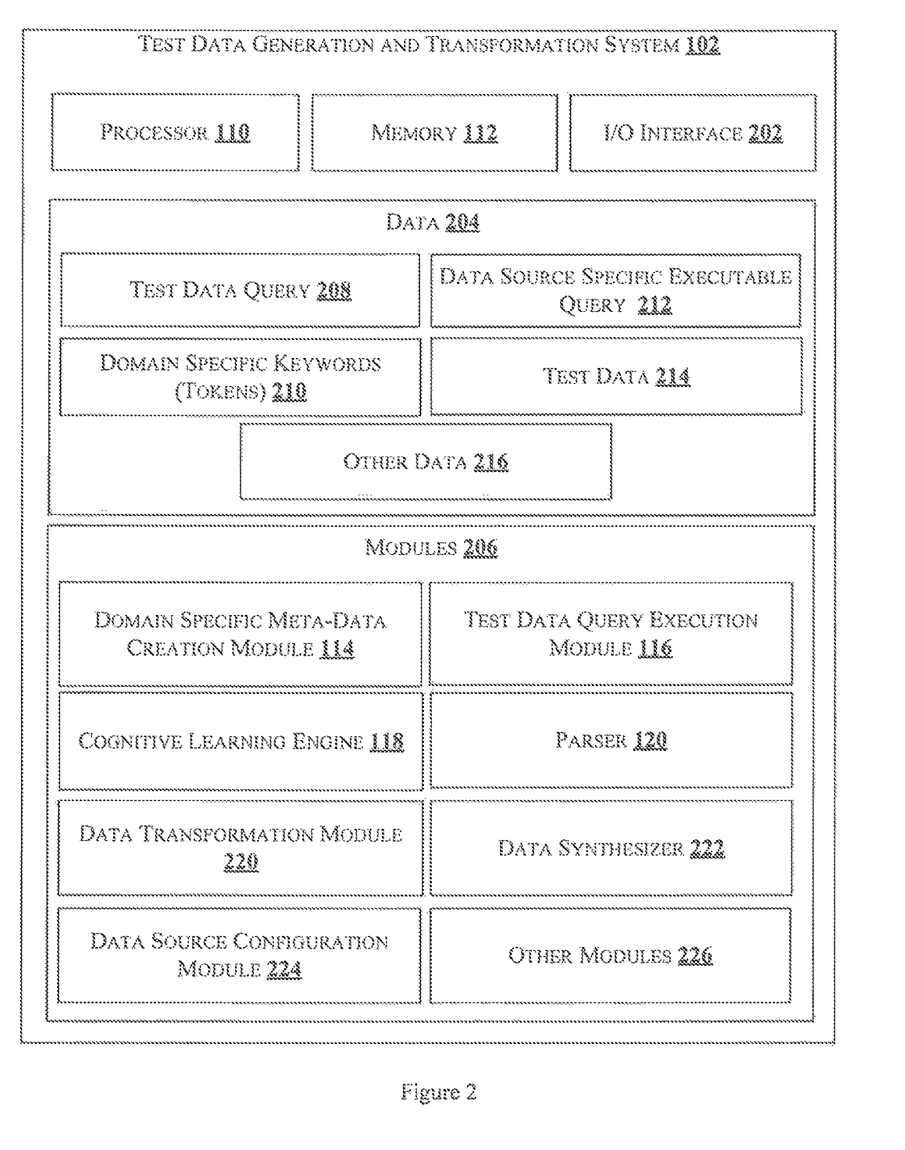
FIG. 2 illustrates an exemplary block diagram of a test data generation and transformation system of FIG. 1 in accordance with some embodiments of the present disclosure.

The test data generator 102 may be a typical test data generator as illustrated in FIG. 2. The test data generator 102 comprises the processor 110, the memory 112, and an I/O interface 202. The I/O interface 202 is coupled with the processor 110 and an I/O device. The I/O device is configured to receive inputs via the I/O interface 202 and transmit outputs for displaying in the I/O device via the I/O interface 202. The I/O interface 202 may be configured to input test data query in natural language for generating test data and transforming the generated test data to suit with the format definition of the target system 108.

The test data generator 102 further comprises data 204 and modules 206. In one implementation, the data 204 may be stored within the memory 112. In one example, the data 204 may include test data query 208, domain specific context names 210, data source specific executable query 212, test data 214 and other data 216. In one embodiment, the data 204 may be stored in the memory 112 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data, temporary files and predetermined domain specific meta-data, filter conditions, condition separators, transformation operators and functions, generated by the modules 206 for performing the various functions of the test data generator 102.

The modules 206 may include, for example, the meta-data creation 114, the query execution module 116, the cognitive learning engine 118, parser 120, a data transformation module 220, data synthesizer 222 and data source configuration module 224. The modules 206 may also comprise other modules 226 to perform various miscellaneous functionalities of the test data generator 102. It will be appreciated that such aforementioned modules may be represented as a single module or a combination of different modules. The modules 206 may be implemented in the form of software, hardware and/or firmware.

In operation, the test data generator 102 generates the test data 214 corresponding to the test data query 208 and transforms the generated test data 214 to comply with the requirements of the target system 108. The test data query 208 may be received via the I/O interface 202. Prior to generating the test data 214, the test data generator 102 enables configuration of the plurality of data sources 106 from which the relevant data required for executing the test data query 208 will be fetched. In one embodiment, the data source configuration module 224 enables configuration of the plurality of data sources 106 based on data source related information such as Database name, Server IP address, user credentials and Port name and Database source, file folders and file names associated with the domain specific meta-data. In one example, if the data source is a relational or NoSQL database, then the data source configuration module 224 receives data source Server IP/Port address, Data source authentication parameters like username/password and Data source schema details via the I/O interface 202. In another example, if the data source is a file source, then the data source configuration module 224 receives file path, authentication parameters like Server IP/username/password via the I/O interface 202.

The data source configuration module 224 is configured to perform operations on data sources such as creation of new data source, editing and deletion of the plurality of data sources 106. The data source configuration module 224 is further configured to verify the configuration and connection of the plurality of data sources 106 with the test data generator 102 based on the data source related information received as input via the I/O interface 202. Upon verification of the data source connection, the test data generator 102 creates domain specific meta-data 122 for the plurality of configured data sources 106.

In one embodiment, the meta-data creation module 114 generates domain specific meta-data for the plurality of configured data sources 106 based on the one or more tables, columns and data type of the columns associated with the plurality of configured data sources 106. The meta-data creation module 114 extracts the one or more tables, columns and data type of the columns from the relevant schema of the plurality of configured data sources 106 and filters only relevant information from the extracted data based on business functionality, and test data requirements. The meta-data creation module 114 also hides or removes confidential information like sensitive table or column present in the plurality of configured data sources 106 to avoid being queried by the test data generator 102. The meta-data creation module 114 updates the test data repository 104 with the filtered table or columns and processes each filtered column or table to determine a corresponding alternative text or domain context specific names.

In one implementation, the meta-data creation module 114 lemmatizes each column or table to find a corresponding alternative text or synonym for the said column or table. Further the meta-data creation module 114 generates expanded column or table name to determine the alternative text for the column or table. In another implementation, the meta-data creation module 114 splits the column or table name into a sequence of tokens or capitalize the column or table name and further lemmatizes the split tokens to determine the alternative text or names for each column or table. Furthermore, the meta-data creation module 114 converts the abbreviated column or table name into corresponding domain context specific names and updates the test data repository 104 with the domain context specific names or domain specific meta-data 122. Upon creating the domain specific meta-data 122 for the plurality of configured data sources 106, the test data generator 102 processes the received test data query 208.

In one embodiment, the test data generator 102 receives the test data query 208 that specifies selection parameters for selecting test data from the plurality of data sources 106. The selection parameters specify different parameters for selecting test data, wherein each parameter is associated with a domain such as column in a table, stored in the plurality of data sources 106. The test data query 208 may be received in natural language that is easily understood by a user without the requirement of technical knowledge of constructing specific syntax based queries to retrieve the test data 214. The test data generator 102 preprocesses the received test data query 208 to extract a plurality of domain specific context names or keywords (hereinafter referred to as tokens) 210. In one embodiment, the parser 120 processes the received test data query 208 to extract the tokens 210. During the extraction of the tokens 210, the parser 120 in conjunction with processor 110 removes most commonly used words (i.e. stop words) from the received test data query 208 to generate the tokens 210. Stop words include preposition, common nouns, and other non-relevant words. Tokens 210 may be data source context specific words for example, SQL context specific words like "Where", "from" and so on. In another embodiment, if the domain context specific words like "employee", "sex", "male", "greater", "more" and so on are part of the stop words, then the parser 120 do not remove the domain context specific names from the received test data query while generating the tokens 210.

Based on the generated tokens 210, the parser 120 in conjunction with processor 110 determines one or more columns, tables, and filter conditions associated with the received test data query 208. In one embodiment, the parser 120 in conjunction with processor 110 maps the generated tokens 210 with the domain specific meta-data 122 predetermined and stored in the test data repository 104. In one implementation, the parser 120 in conjunction with processor 110 maps every three tokens 210 of the received test data query 208 with each of the domain specific meta-data 122 to determine the matching columns or tables of the plurality of configured data sources 106. In another implementation, the parser 120 in conjunction with processor 110 maps every two tokens 210 of the received test data query 208 with each of the domain specific meta-data 122 to determine the matching columns or tables of the plurality of configured data sources 106. In yet another implementation, the parser 120 in conjunction with processor 110 maps every single token 210 of the received test data query 208 with each of the domain specific meta-data 122 to determine the matching columns or tables of the plurality of configured data sources 106. Upon determining the one or more matching columns or tables, the test data generator 102 retrieves the test data 214 from the one or more matching columns or tables.

In another embodiment, the parser 120 in conjunction with processor 110 determines the one or more columns or tables from the historical test data 120 stored in the test data repository 104. The historical test data 120 comprises the plurality of historical test queries, and plurality of historical meta-data associated with the plurality of historical test queries. In one implementation, the parser 120 in conjunction with processor 110 determines the historical meta-data i.e., columns or tables associated with at least one historical test query that is matching with the test data query 208. In another implementation, the cognitive learning engine 118 is configured to prompt the plurality of historical test queries when the test data query 208 is being input by the tester. Based on the test data query 208 received as input, the parser 120 in conjunction with processor 110 retrieves the one or more columns or tables i.e., the meta-data corresponding to the at least one historical test query best matching with the test data query 208. Upon retrieving the one or more columns, the cognitive learning engine 118 displays each of the one or more matching columns to the tester to validate the one or more columns thus retrieved. If the tester invalidates the one or more columns, the tester may provide a valid column as input to the cognitive learning engine 118 overriding the one or more retrieved columns. The cognitive learning engine 118 also updates the test data repository 104 with the valid column and accordingly, the parser 120 retrieves the one or more valid matching columns.

The parser 120 in conjunction with processor 110 may also retrieve the one or more matching columns by filtering the one or more matching columns based on one or more filter conditions present in the test data query 208. In one implementation, the parser 120 in conjunction with processor 110 determines the one or more filter conditions based on presence of one or more condition separators such as "Where", "Which" and so on. The parser 120 in conjunction with processor 110 also searches for column or condition operators like "less", "more", "equal" and so on, based on successful determination of the one or more filter conditions. Based on the one or more matching columns or tables, one or more filter conditions and the one or more condition separators, the parser 120 in conjunction with processor 110 generates a generic test data query that is converted into one or more data source specific executable query 212 based on the type of the plurality of data sources 106.

In one embodiment, the query execution module 116 converts the generic test data query into data source specific executable query 212 for each type of the plurality of data sources 106. For example, if the data source is of type Relational database, then the query execution module 116 generates the data source specific executable query 212 for example, a SQL query. In another example, if the data source is of type NoSQL database, then the query execution module 116 generates the data source specific executable query 212 for example, in a custom query format. In yet another example, if the data source is of type Representational state transfer (REST) service, then the query execution module 116 generates the data source specific executable query 212 for example, in REST service request format. In still another example, if the data source is of type FILE, then the query execution module 116 generates the data source specific executable query 212 for example, in a custom data extraction format. Upon generating the data source specific executable query 212, the query execution module 116 executes the data source specific executable query 212 on corresponding plurality of data sources 106 to generate test data 214. In another embodiment, the query execution module 116 displays the data source specific executable query 212 to the tester for validation and updates the domain specific metadata based on the validation before execution. Based on the output generated i.e., the generated test data 214, the test data generator 102 determines if there are any missing test data.

In one embodiment, the data synthesizer 222 identifies missing test data in the generated test data 214 by comparing the generated test data 214 with the test data query 208. The data synthesizer 222 compares the attributes of the generated test data 214 with the attributes as requested in the test data query 208. For example, the attributes may include, but not limited to number of records, number of selection parameters, number of filter conditions, number of group values, and accuracy of data values. Based on comparison, if the data synthesizer 222 determines any difference in at least one attribute, then it is determined that there is test data missing. For example, if the test data query 208 mentions 10 records and the generated test data 214 comprises only 4 records, the data synthesizer 222 generates 6 more records based on the inputs including, data type of the records, number of records to be generated, and group range or value of the records to be generated or created. The data synthesizer 222 also determines the correctness of the generated test data 214 based on comparing the data type of the generated test data 214 with the data type in the test data query 208. The data synthesizer 222 generates the missing test data and updates the test data repository 120 with the test data 214 and corresponding test data query 208. The test data generator 102 may also transform the generated test data 214 into a pre-defined format suitable for consumption by the target system 108.

In one embodiment, the data transformation module 220 transforms the generated test data 214 based on the context of an automation framework or the tester. In one embodiment, the data transformation module 220 transforms the generated test data 214 into one or more suitable file formats for example, XML, JSON, SQL file formats suitable to the requirements of the tester. The transformed test data 214 is ready to use by the tester in the target system 108. In another embodiment, the data transformation module 220 transforms the generated test data 214 into one or more suitable file formats for example, EXCEL, XML, JSON file, REST service JSON response, suitable to meet the requirements of the automation framework. The data transformation module 220 identifies the target format, retrieve the format specification information and convert the generated test data 214 into the target format using the format specification information thus retrieved.

Thus, the system generates test data specific to different data sources based on query provided in natural language and transforms the generated test data to comply with the requirements of the target system.

Figure 3:
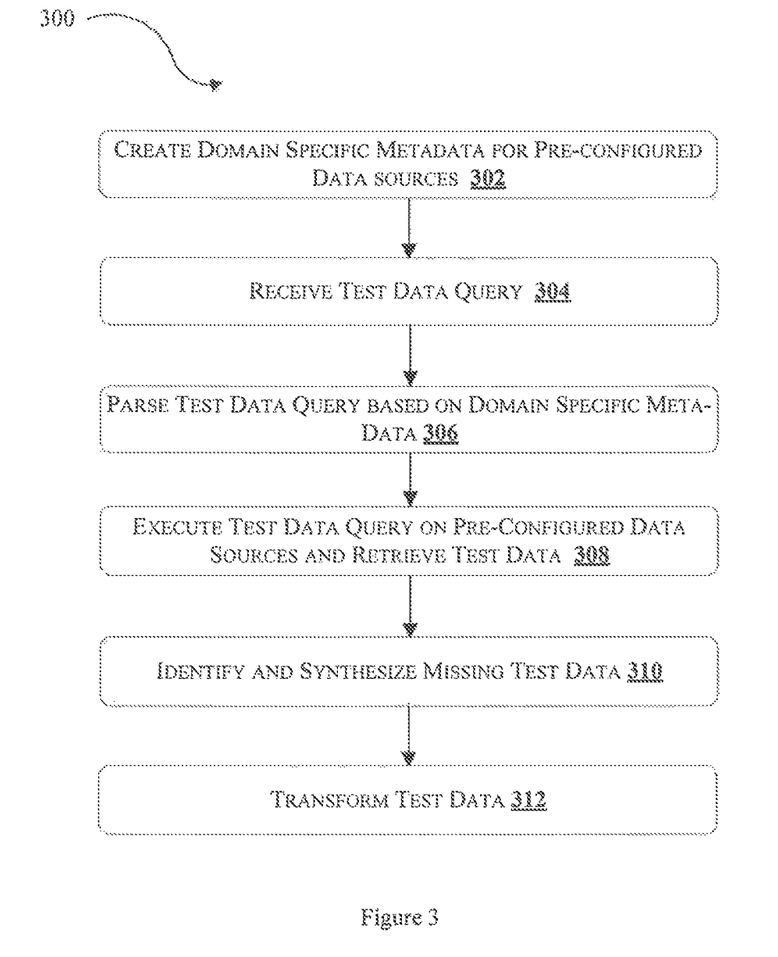
FIG. 3 illustrates a flowchart of an exemplary method of generating and transforming test data in accordance with some embodiments of the present disclosure.

FIG. 3 illustrates a flowchart of a method of automatically generating test data for testing applications in accordance with some embodiments of the present disclosure.

As illustrated in FIG. 3, the method 300 comprises one or more blocks implemented by the processor 110 for monitoring the refrigeration system. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

As disclosed, the method 300 is implemented to automatically generate the test data 214 corresponding to the test data query 208 and transform the generated test data 214 to comply with the requirements of the target system 108. The test data generator 102 fetches the test data 214 from the previously configured plurality of data sources 106 based on predetermined domain specific meta-data 122, corresponding to the plurality of data sources 106, stored in the test data repository 104. As illustrated in FIG. 2, the data source configuration module 224 configures the plurality of data sources 106.

At block 302, create domain specific meta-data. In one embodiment, the meta-data creation module 114 generates domain specific meta-data 122 for the columns or tables of the databases stored in the plurality of configured data sources 106. The meta-data creation module 114 extracts the one or more tables, columns and data type of the columns from the relevant schema of the plurality of configured data sources 106 and filters only relevant information from the extracted data based on business functionality, and test data requirements. The meta-data creation module 114 also hides or removes confidential information like sensitive table or column present in the plurality of configured data sources 106 to avoid being queried by the test data generator 102. The meta-data creation module 114 updates the test data repository 104 with the filtered table or columns and processes each filtered column or table to determine a corresponding alternative text or domain context specific names.

In one implementation, the meta-data creation module 114 lemmatizes each column or table to find a corresponding alternative text or synonym for the said column or table. Further the meta-data creation module 114 generates expanded column or table name or splits the column or table name into a sequence of tokens or capitalize the column or table name and further lemmatizes the split tokens to determine the alternative text or names for each column or table. Furthermore, the meta-data creation module 114 converts the abbreviated column or table name into corresponding domain context specific names and updates the test data repository 104 with the domain context specific names or domain specific meta-data 122. Upon creating the domain specific meta-data 122 for the plurality of configured data sources 106, the test data generator 102 processes the received test data query 208.

For example, if the data source is Oracle, the meta-data creation module 114 generates the domain specific meta data 122 as illustrated below in Table 1.

TABLE 1

| Table Name | Column Name | Data Type | Data Length | Precision | Constraint |
|---|---|---|---|---|---|
| CREDIT CARD | TRAN_DATE | Date time | | | |
| CREDIT CARD | TRAN_STATUS | String | 1 | | |
| CREDIT CARD | TRAN_AMOUNT | Number | | | |
| CREDIT CARD | TRAN_CURRENCY | String | | | |
| CREDIT CARD | CC_NUMBER | String | | | |
| CREDIT CARD | CC_NAME | String | | | |
| CUSTOMER_MASTER | CUSTOMER_ID | String | | | |
| CUSTOMER_MASTER | CUSTOMER_NAME | String | | | |

At block 304, receive test data query. In one embodiment, the test data generator 102 receives the test data query 208 that specifies selection parameters for selecting test data from the plurality of data sources 106. The selection parameters specify different parameters for selecting test data, wherein each parameter is associated with a domain such as column in a table, stored in the plurality of data sources 106. The test data query 208 may be received in natural language that is easily understood by a user without the requirement of technical knowledge of constructing specific syntax based queries to retrieve the test data 214. In one implementation, the test data query 208 may be received via the I/O interface 202 as illustrated in FIG. 2. The test data query 208 may be for illustrated below in (1):

Can I get at least 10 rows from credit card information if the transaction month is November 2016 and customer location is California (1)

At block 306, parse test data query based on domain specific meta-data. In one embodiment, the parser 120 in conjunction with the processor 110 processes the received test data query 208 to extract the tokens 210. During the extraction of the tokens 210, the parser 120 in conjunction with the processor 110 removes most commonly used words (i.e. stop words) from the received test data query 208 to generate the tokens 210. As per the example in (1), the parser 120 in conjunction with the processor 110 generates the tokens 210 as illustrated below in (2):

Can, I, get, at least, 10, rows, from, credit, card, information, if the, transaction, month, is, November, 2016, and, customer, location, is, California (2)

The parser 120 in conjunction with the processor 110 removes non-relevant data from (2) to generate the following tokens 214 as illustrated below in (3):

10, rows, credit, card, transaction, month, November, 2016, and, customer, location, California (3)

Based on the generated tokens 210, the parser 120 in conjunction with the processor 110 determines at least one columns, tables, and filter conditions associated with the received test data query 208. In one embodiment, the parser 120 in conjunction with the processor 110 maps the generated tokens 210 with the domain specific meta-data 122 predetermined and stored in the test data repository 104. For example, the parser 120 in conjunction with the processor 110 maps the generated tokens 214 as illustrated in (3) with the domain specific meta-data 122 stored in the test data repository 104 to determine at least one column or table relevant to the generated tokens in (3). One illustration of mapping columns matching with the generated tokens 214 is illustrated below in (4):

Tran_Date, State, Credit_Card (4)

The parser 120 may also retrieve the one or more matching columns by filtering the one or more matching columns based on one or more filter conditions present in the test data query 208. In one implementation, the parser 120 determines the one or more filter conditions based on presence of one or more condition separators such as "Where", "Which" and so on. The parser 120 also searches for column or condition operators like "less", "more", "equal" and so on, based on determination of the one or more filter conditions. Based on the one or more matching columns or tables, one or more filter conditions and the one or more condition separators, the parser 120 generates a generic test data query that is converted into one or more data source specific executable query 212 based on the type of the plurality of data sources 106. For example, the parser 120 generates the generic test data query as illustrated below in (5):

Tran Date in "November" and Tran_Date in 2016 and State is "California" and card is "Credit Card" (5)

At block 308, execute test data query on pre-configured data sources and retrieve test data. The test data generator 102 executes the test data query 208 on the previously configured plurality of data sources 106 to generate the test data 214. In one embodiment, the query execution module 116 converts the generic test data query into data source specific executable query 212 for each type of the plurality of data sources 106. For example, if the data source is of type Relational database (RDBMS), then the query execution module 116 generates the data source specific executable query 212 for example, a SQL query as illustrated below in (6):

SELECT Tran_Date, State, card from card where
Tran_Date='November 2016' and
State='California' and card='Credit Card' (6)

The query execution module 116 executes the data source specific executable query 212 on corresponding plurality of data sources 106 i.e. RDBMS to generate test data 214.

At block 310, identify and synthesize missing test data. The test data generator 102 determines if there are any missing test data in the test data 214 generated upon execution of the data source specific executable query 212 on corresponding plurality of data sources 106. In one embodiment, the data synthesizer 222 identifies missing test data in the generated test data 214 by comparing the generated test data 214 with the test data query 208. The data synthesizer 222 compares the attributes of the generated test data 214 with the attributes as requested in the test data query 208. For example, when the test data query 208 as illustrated in (6) is executed, the test data 214 is generated which is illustrated below in Table 2:

TABLE 2

| Tran_Date | State | Card |
|---|---|---|
| 10 Nov. 2016 | California | 401382943252132 |
| 16 Nov. 2016 | California | 401586990345756 |
| 23 Nov. 2016 | California | 413467832467290 |
| 27 Nov. 2016 | California | 484523544395734 |
| 29 Nov. 2016 | California | 464127872342351 |

As it is understood, that the test data query 208 as illustrated in (1) requires 10 records, however the test data 214 generated in Table 2 shows only 5 records. The data synthesizer 222 determines that 5 more records are missing and synthesizes the 5 records of Table 2 to generate the additional 5 records as determined. The data synthesizer 222 uses the following as input:
Columns to create
Date (range 01/11/2016 to 30/11/2016)
State (value: California)
Card (Master Credit card)
Number of rows to create: 5

Based on the above-mentioned input, the data synthesizer 222 generates the missing test data as illustrated below in Table 3:

| Tran_Date | State | Card |
|---|---|---|
| 02 Nov. 2016 | California | 429826249824598 |
| 05 Nov. 2016 | California | 408124187398923 |
| 08 Nov. 2016 | California | 445698223489867 |
| 10 Nov. 2016 | California | 401382943252132 |

-continued

| Tran_Date | State | Card |
|---|---|---|
| 14 Nov. 2016 | California | 498721387634872 |
| 16 Nov. 2016 | California | 401586990345756 |
| 19 Nov. 2016 | California | 492312308712394 |
| 23 Nov. 2016 | California | 413467832467290 |
| 26 Nov. 2016 | California | 476234689292667 |
| 27 Nov. 2016 | California | 484523544395734 |
| 29 Nov. 2016 | California | 464127872342351 |

Rows that are synthesized

At block 312, transform test data. In one embodiment, the test data generator 102 may also transform the generated test data 214 into a pre-defined format suitable for consumption by the target system 108. In one embodiment, the data transformation module 220 transforms the generated test data 214 based on the context of an automation framework or the tester. The data transformation module 220 identifies the target format, retrieve the format specification information and convert the generated test data 214 into the target format using the format specification information thus retrieved. An example test data 214 that is transformed to suit the requirements of the target system 108 is illustrated below in (7):

TranDate,State,Card 02/11/2016,California,
429826249824598 05/11/2016,California,
408124187398923 08/11/2016,California,
445698223489867 10/11/2016,California,
401382943252132 14/11/2016,California,
498721387634872 16/11/2016,California,
401586990345756 19/11/2016,California,
492312308712394 23/11/2016,California,
413467832467290 26/11/2016,California,
476234689292667 27/11/2016,California,
484523544395734 29/11/2016,California,
464127872342351 (7)

Thus, the system enables monitoring the status or health of the refrigeration and predicting the possibility of maintenance required by leveraging the time stamped temperature data & statistical means. The system also enables the enterprise view of the asset health system to the needs of the customer, reducing the operational cost, wastage of food & maintain the food safety norms as per the standard.

Figure 4:
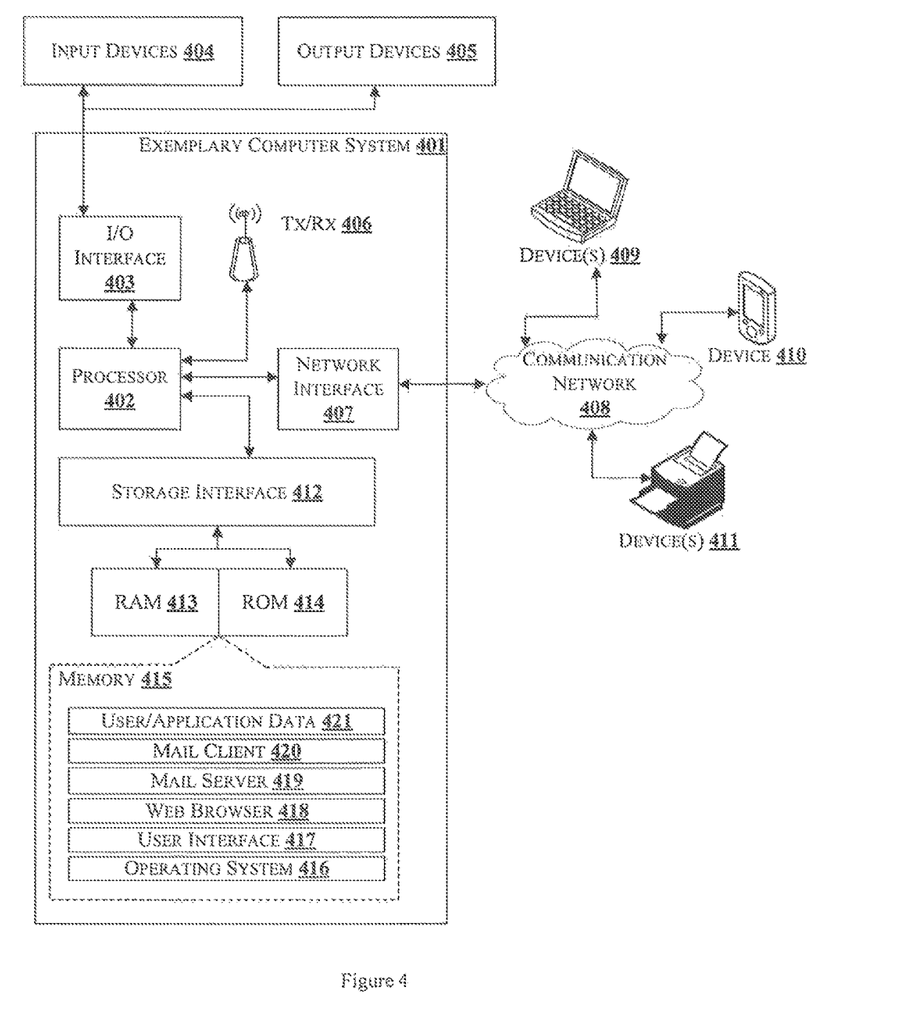
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. The processor 402 may comprise at least one data processor for executing program components for executing user- or system-generated requests. The processor 402 may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be. implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver 406 may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices 409, 410 and 411 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface 412 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 416, a user interface application 517, a web browser 418, a mail server 419, a mail client 420, user/application data 421 (e.g., any data variables or data records discussed in this disclosure), etc. The operating system 416 may facilitate resource management and operation of the computer system 401. Examples of the operating system 416 include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface application 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser 418 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. The web browser 418 may utilize facilities such as AJAX, DHTML, Adobe Flash, JavaScript, Java, application programming interfaces (APIs), etc. In some embodiments, the computer system 401 may implement a mail server 419 stored program component. The mail server 419 may be an Internet mail server such as Microsoft Exchange, or the like. The mail server 419 may utilize facilities such as ASP, ActiveX, ANSI C++/C#, Microsoft .NET, CGI scripts, Java, JavaScript, PERL, PHP, Python, WebObjects, etc. The mail server 419 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client 420 may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

Advantages of the Embodiment of the Present Disclosure are Illustrated Herein

In an embodiment, the present disclosure enables generation of test data specific to different data sources based on query provided in natural language and transforms the generated test data to comply with the requirements of the target system.

In an embodiment, the present disclosure automatically identifies missing test data generated during the test data generation process and creates missing test data suitable to the user query with improved accuracy and correctness.

It is intended that the disclosure and examples be considered as exemplary only, with a true scope and spirit of disclosed embodiments being indicated by the following claims.

What is claimed is:

1. A method for generating test data, said method comprising:
receiving, by a processor of a test data generation and transformation system, a test data query, in natural language, comprising at least a selection parameter for generation of test data from one or more data sources coupled to the test data generation and transformation system;
parsing, by the processor, the received test data query to extract a plurality of domain specific context names;
mapping, by the processor, the plurality of domain specific context names with predetermined domain specific meta-data to determine one or more columns, tables, and filter conditions associated with the received test data query, the domain specific meta-data is associated with each column and table of one or more data sources;
determining, by the processor, a data source specific executable query comprising one or more columns, tables, and filter conditions associated with the received test data query, based on at least the selection parameter and the mapped plurality of domain specific context names;
executing, by the processor, the data source specific executable query in the one or more data sources to generate the test data;
identifying missing test data in the generated test data, based on deviation in the count of records, parameters, filter conditions, group values, accuracy of data values associated with the test data compared with the count of records, parameters, filter conditions, and group values associated with the test data query; and
generating the one or more identified missing test data based on the number of columns to create and number of rows to create received as input.

2. The method as claimed in claim 1, wherein the domain specific meta-data is determined by one or more steps of:
extracting one or more tables, one or more columns of each table, and data type of each column of each table;
filtering the one or more columns and the one or more tables;
lemmatizing each column and table based on the filtering to determine one or more alternative names corresponding to each column and table; and
generating domain context specific names for each column and table based on one or more alternative names determined.

3. The method as claimed in claim 1, wherein the one or more data sources comprise relational databases, NoSQL databases, and file sources.

4. The method as claimed in claim 3, wherein each of the relational and NoSQL databases is configured based on one or more parameters including data source server IP/Port address, data source authentication information, and data source schema information, further wherein the file sources are configured based on parameters including data source file path name and data source authentication information.

5. The method as claimed in claim 1, wherein parsing of the test data query comprising:
identifying one or more historical queries related to the received test data query, based on one or more cognitive learning techniques; and
determining domain specific meta-data corresponding to the one or more identified historical queries for generating a generic data structure.

6. The method as claimed in claim 1, further comprising transforming the generated test data into a pre-defined format for consumption of the generated data by a target system.

7. The method as claimed in claim 1, further comprising presenting the determined data source specific executable query to a user for validation.

8. The method as claimed in claim 7, further comprising updating the domain specific meta-data based on the validation of the data source specific executable query.

9. A test data generation and transformation system, said system comprising:
a processor; and
a memory, communicatively coupled to the processor, wherein the memory stores processor-executable instructions, which, on execution, cause the processor to:
receive a test data query, in natural language, comprising at least a selection parameter for generation of test data from one or more data sources coupled to the test data generation and transformation system;
parse the received test data query to extract a plurality of domain specific context names;
map the plurality of domain specific context names with predetermined domain specific meta-data to determine one or more columns, tables, and filter conditions associated with the received test data query, the domain specific meta-data is associated with each column and table of one or more data sources;
determine a data source specific executable query comprising one or more columns, tables, and filter conditions associated with the received test data query, based on at least the selection parameter and the mapped plurality of domain specific context names;
execute the data source specific executable query in the one or more data sources to generate the test data;
identify missing test data in the generated test data, based on deviation in the count of records, parameters, filter conditions, group values, accuracy of data values associated with the test data compared with the count of records, parameters, filter conditions, and group values associated with the test data query; and
generate the one or more identified missing test data based on the number of columns to create and number of rows to create received as input.

10. The system as claimed in claim 9, wherein the processor is configured to determine the domain specific meta-data by:
extracting one or more tables, one or more columns of each table, and data type of each column of each table;
filtering the one or more columns and the one or more tables using one or more condition separators;
lemmatizing each column and table based on the filtering to determine one or more alternative names corresponding to each column and table; and
generating domain context specific names for each column and table based on one or more alternative names determined.

11. The system as claimed in claim 9, wherein the one or more data sources comprise relational databases, NoSQL databases, and file sources.

12. The system as claimed in claim 11, wherein each of the relational and NoSQL databases is configured based on one or more parameters including data source server IP/Port address, data source authentication information, and data source schema information, further wherein the file sources are configured based on parameters including data source file path name and data source authentication information.

13. The system as claimed in claim 9, wherein the processor is configured to parse the test data query by:
identifying one or more historical queries related to the received test data query, based on one or more cognitive learning techniques; and
determining domain specific meta-data corresponding to the one or more identified historical queries for generating a generic data structure.

14. The system as claimed in claim 9, wherein the processor is further configured to transform the generated test data into a pre-defined format for consumption of the generated data by a target system.

15. The system as claimed in claim 9, wherein the processor is further configured to present the determined data source specific executable query to a user for validation.

16. The system as claimed in claim 15, wherein the processor is configured to update the domain specific meta-data based on the validation of the data source specific executable query.

17. A non-transitory computer readable medium including instructions stored thereon that when processed by at least one processor cause a test data generation and transformation system to perform acts of:
receiving a test data query, in natural language, comprising at least a selection parameter for generation of test data from one or more data sources coupled to the test data generation and transformation system;
parsing the received test data query to extract a plurality of domain specific context names;
mapping the plurality of domain specific context names with predetermined domain specific meta-data to determine one or more columns, tables, and filter conditions associated with the received test data query, the domain specific meta-data is associated with each column and table of one or more data sources;
determining a data source specific executable query comprising one or more columns, tables, and filter conditions associated with the received test data query, based on at least the selection parameter and the mapped plurality of domain specific context names;
executing the data source specific executable query in the one or more data sources to generate the test data;
identify missing test data in the generated test data, based on deviation in the count of records, parameters, filter conditions, group values, accuracy of data values associated with the test data compared with the count of records, parameters, filter conditions, and group values associated with the test data query; and
generate the one or more identified missing test data based on the number of columns to create and number of rows to create received as input.

18. The medium as claimed in claim 17, wherein the instructions stored thereon causes the at least one processor to determine the domain specific meta-data by:
extracting one or more tables, one or more columns of each table, and data type of each column of each table;
filtering the one or more columns and the one or more tables using one or more condition separators;
lemmatizing each column and table based on the filtering to determine one or more alternative names corresponding to each column and table; and
generating domain context specific names for each column and table based on one or more alternative names determined.

* * * * *